(12) United States Patent
Qin et al.

(10) Patent No.: US 12,504,814 B2
(45) Date of Patent: Dec. 23, 2025

(54) GESTURE-INITIATED EYE ENROLLMENT

(71) Applicant: Apple Inc., Cupertino, CA (US)

(72) Inventors: Hao Qin, Saratoga, CA (US); Hua Gao, San Jose, CA (US); Tom Sengelaub, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/534,388

(22) Filed: Dec. 8, 2023

(65) Prior Publication Data
US 2024/0211038 A1 Jun. 27, 2024

Related U.S. Application Data

(60) Provisional application No. 63/476,926, filed on Dec. 22, 2022.

(51) Int. Cl.
*G06F 3/01* (2006.01)
*G02B 27/01* (2006.01)
*G06T 19/00* (2011.01)

(52) U.S. Cl.
CPC ........... *G06F 3/013* (2013.01); *G02B 27/017* (2013.01); *G06F 3/017* (2013.01); *G06T 19/006* (2013.01)

(58) Field of Classification Search
CPC ....... G06F 3/013; G06F 3/017; G02B 27/017; G06T 19/006
See application file for complete search history.

(56) References Cited

U.S. PATENT DOCUMENTS

| | | | |
|---|---|---|---|
| 10,554,950 B1* | 2/2020 | Curlander | H04N 13/332 |
| 11,619,994 B1* | 4/2023 | Bhat | G02C 7/04 |
| | | | 345/156 |
| 2010/0050134 A1* | 2/2010 | Clarkson | G06F 3/017 |
| | | | 715/863 |
| 2013/0021373 A1 | 1/2013 | Vaught | |
| 2013/0050642 A1 | 2/2013 | Lewis et al. | |
| 2013/0156265 A1 | 6/2013 | Hennessy | |
| 2014/0055591 A1 | 2/2014 | Katz | |

(Continued)

FOREIGN PATENT DOCUMENTS

| WO | 2016073131 | 5/2016 |
|---|---|---|
| WO | 2022261205 | 12/2022 |

OTHER PUBLICATIONS

International Search Report and Written Opinion from PCT/US2023/085497, dated Apr. 30, 2024, pp. 1-12.

*Primary Examiner* — Antonio Xavier
(74) *Attorney, Agent, or Firm* — Robert C. Kowert; Kowert, Hood, Munyon, Rankin & Goetzel, P.C.

(57) ABSTRACT

Methods to trigger eye enrollment without requiring good gaze interaction are described that allow a guest user of a device to initiate partial or full eye enrollment even though their eye model is not known and thus conventional gaze-based interactions do not work well. A gaze tracking system collects gaze data in the background. At any time (or within an interval after a user puts on the device), an eye enrollment can be triggered by detecting some gaze gesture, for example rolling the eyes in a large circle, or moving the eyes randomly for a time that exceeds a threshold. Depending on the coverage of the gaze/cornea data collected in the background, a full eye enrollment or only a visual axis enrollment may be performed in response to the gesture.

20 Claims, 8 Drawing Sheets

(56) References Cited

U.S. PATENT DOCUMENTS

| | | | |
|---|---|---|---|
| 2014/0331315 A1* | 11/2014 | Birk | G06F 21/36 |
| | | | 726/19 |
| 2015/0288944 A1 | 10/2015 | Nistico | |
| 2016/0018646 A1 | 1/2016 | Osterhout | |
| 2016/0134863 A1 | 5/2016 | Horesh | |
| 2016/0349510 A1* | 12/2016 | Miller | H04N 13/398 |
| 2017/0263007 A1 | 9/2017 | Cavin | |
| 2017/0364732 A1* | 12/2017 | Komogortsev | G06T 7/248 |
| 2018/0032812 A1 | 2/2018 | Sengelaub et al. | |
| 2018/0246336 A1* | 8/2018 | Greenberg | G02B 27/0176 |
| 2019/0042842 A1* | 2/2019 | Cavin | G06V 40/197 |
| 2019/0392145 A1* | 12/2019 | Komogortsev | G06F 21/32 |
| 2020/0033560 A1 | 1/2020 | Weber et al. | |
| 2020/0096786 A1* | 3/2020 | Toner | G02C 7/04 |
| 2020/0257359 A1 | 8/2020 | Klingstrom | |
| 2020/0265598 A1* | 8/2020 | Iyer | G06T 7/579 |
| 2020/0364441 A1* | 11/2020 | O'Sullivan | G06V 40/193 |
| 2021/0011549 A1 | 1/2021 | Ryan | |
| 2021/0173206 A1* | 6/2021 | Das | G02B 27/0179 |
| 2021/0181514 A1* | 6/2021 | Martin | G02B 27/0093 |
| 2022/0270645 A1 | 8/2022 | Song | |
| 2023/0038781 A1 | 2/2023 | Ryu | |
| 2023/0319417 A1* | 10/2023 | Johansson | G02B 27/0093 |
| 2023/0394127 A1* | 12/2023 | Tussy | H04L 63/123 |
| 2024/0078846 A1* | 3/2024 | Chyn | G06V 40/50 |
| 2024/0103618 A1 | 3/2024 | Benndorf et al. | |
| 2024/0211038 A1 | 6/2024 | Qin et al. | |

\* cited by examiner

GESTURE-INITIATED EYE ENROLLMENT

PRIORITY APPLICATION

This application claims benefit of priority to U.S. Provisional Application Ser. No. 63/476,926, entitled "Gesture-Initiated Eye Enrollment," filed Dec. 22, 2022, and which is hereby incorporated herein by reference in its entirety.

BACKGROUND

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for gesture-based partial or full eye enrollment on a device, for example head-mounted devices (HMDs) including but not limited to HMDs used in extended reality (XR) applications and systems, are described. In such systems, during an initial calibration or enrollment process, a multidimensional personalized model of the user's eye may be generated from one or more images of the eye captured as described above. This personalized eye model may then be used in various algorithms, for example in the gaze estimation process, during use of the device. The personalized eye model may include information such as a cornea surface model, iris and pupil model, eye center, entrance pupil, pupillary or optical axis (a vector which passes through the geometric eye center and the entrance pupil), and a kappa angle between the optical axis and the visual axis. Note that an eye's actual gaze direction corresponds to the visual axis, which is offset from the calculated optical axis of the eye model.

However, another user (referred to herein as a guest user) may be allowed to use the device. Since the primary user has already enrolled and the eye model used in gaze-based interactions is trained on that user's eyes, gaze-based interactions that rely on the eye model (including the estimated visual axis) would most likely not work well for the guest user. A partial or full eye enrollment may be necessary for the guest user to more easily use the gaze-based UI. However, since gaze-based interactions would initially not work well for the guest user, it would be difficult for the guest user to initiate an eye enrollment process using conventional gaze-based UI gestures.

Embodiments of methods and apparatus for gesture-based partial or full eye enrollment on a device are described that allow a guest user of a device to initiate partial or full eye enrollment even though their eye model is not known and thus conventional gaze-based interactions do not work well. Thus, embodiments provide methods to trigger eye enrollment without requiring good gaze interaction.

In embodiments, the gaze tracking system collects gaze data in the background. At any time (or within an interval after a user puts on the device), an eye enrollment can be triggered by detecting some gaze gesture, for example rolling the eyes in a large circle, or moving the eyes randomly for a time that exceeds a threshold. Depending on the coverage of the gaze/cornea data collected in the background, a full eye enrollment or only a visual axis enrollment may be performed in response to the gesture.

Collecting the gaze data in the background may make it so that, in most cases, only visual axis enrollment needs to be performed as an additional step, as an eye model may have been generated and enrolled in the background if enough data has been collected.

While embodiments are primarily described as a way to initiate eye enrollment for a guest user, embodiments may be extended to apply to the primary user as well. For example, if the primary user senses that gaze tracking is not optimal, the primary user may initiate a new eye enrollment (either full eye enrollment or only visual axis enrollment) by making the gesture.

Figure 1:
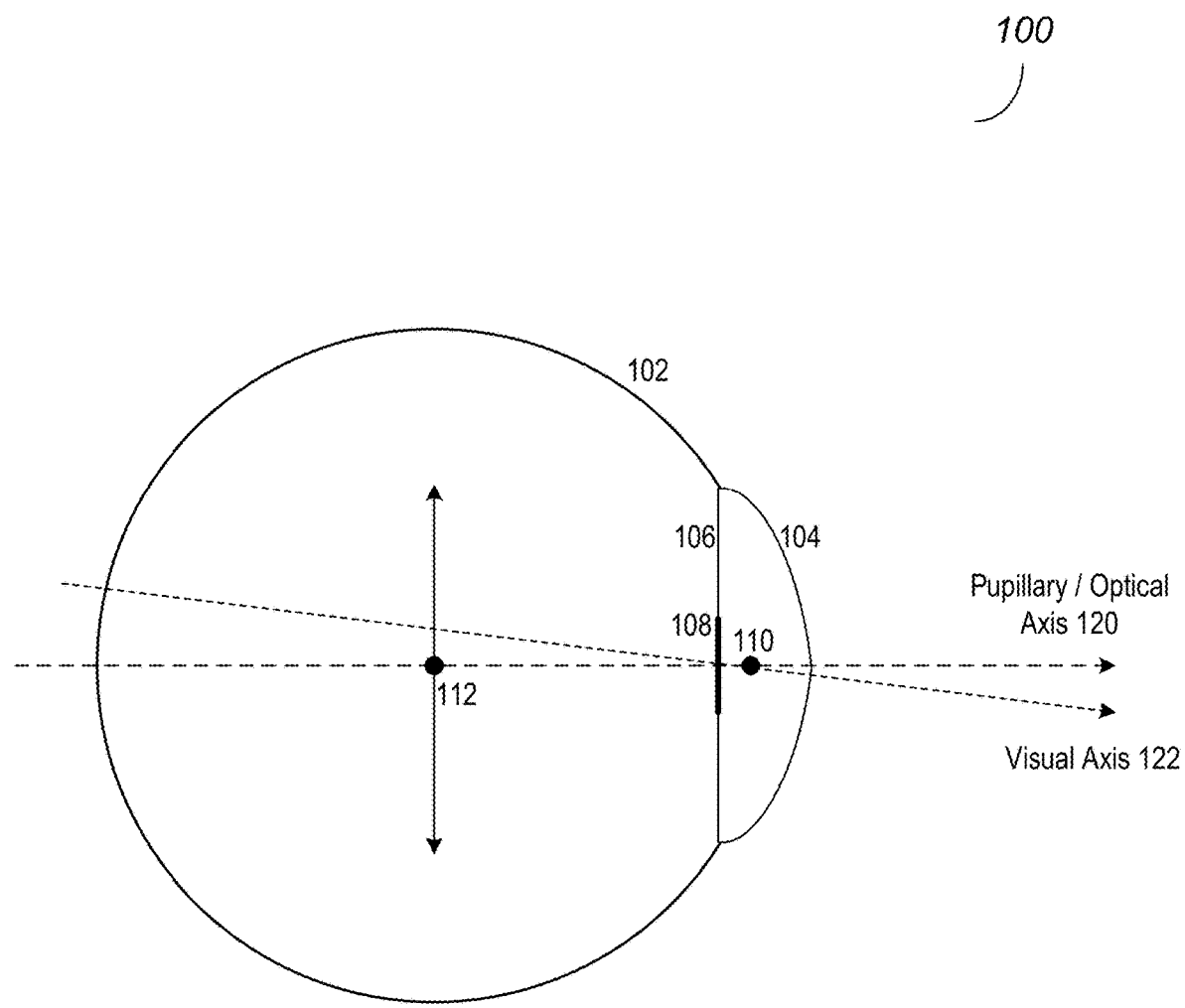
FIG. 1 graphically illustrates an N-dimensional model of an eye, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for gesture-based partial or full eye enrollment on a device, for example head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses.

In at least some systems, the HMD may include gaze tracking technology. In an example gaze tracking system, one or more infrared (IR) light sources emit IR light towards a user's eye. A portion of the IR light is reflected off the eye and captured by an eye tracking camera. Images captured by the eye tracking camera may be input to a glint and pupil detection process, for example implemented by one or more processors of a controller of the HMD. Results of the process are passed to a gaze estimation process, for example implemented by one or more processors of the controller, to estimate the user's current point of gaze. This method of gaze tracking may be referred to as PCCR (Pupil Center Corneal Reflection) tracking. The gaze tracking information may be used in various ways, for example to detect where the user is looking in displayed virtual content or to initiate actions based on gaze-based gestures in a gaze-based user interface (UI).

In such systems, during an initial calibration or enrollment process, a multidimensional personalized model of the user's eye may be generated from one or more images of the eye captured by eye-facing camera(s). FIG. 1 graphically illustrates an N-dimensional model 100 of an eye, according to some embodiments. Physical components of an eye may include a sclera 102, cornea 104, iris 106, and pupil 108. In some embodiments, during an initial calibration or enrollment process, an N-dimensional model of the user's eye 100 may be generated from one or more images of the eye 100. In an example method, one or more infrared (IR) light sources emit IR light towards a user's eye. A portion of the IR light is reflected off the eye and captured by an eye tracking camera. Two or more images captured by the eye tracking camera may be input to an eye model generation process, for example implemented by one or more processors of a controller of the HMD. The process may determine the shapes and relationships of the eye's components based at least in part on positions of the glints (reflections of the point light sources) in the two or more captured images. This information may then be used to generate a personalized eye model for the user. The personalized eye model may include information such as a cornea surface model, iris and pupil model, eye center 112, entrance pupil 110, pupillary or optical axis 120 (a vector which passes through the eye center 112 and the entrance pupil 110), and a kappa angle between the optical axis 120 and the visual axis 122 of the eye. Note that an eye's actual gaze direction corresponds to the visual axis 122, which is offset from the calculated optical axis 120 of the eye model 100. This personalized eye model may then be used in various algorithms, for example in the gaze estimation process, during use of the device.

In a typical scenario, a user (referred to herein as a primary user), may put on the device and an (initial) enrollment process may be initiated in which a personalized eye model, including an optical axis and visual axis, is generated and "enrolled". In some embodiments, the initial eye model may be generated in the background, without requiring any prompting or explicit action by the user; however, in some embodiments, the user may be prompted to perform some action(s) to enroll the personalized eye model, for example to look at a displayed virtual "point" to estimate the visual axis. After the personalized eye model is enrolled, gazed-based interactions with a gaze-based UI may of course work much better than prior to eye model enrollment, as the primary user's optical axis and visual axis are available for use in the gaze tracking processes.

However, another user (referred to herein as a guest user) may be allowed to use the device; for example, the primary user/owner of the device may allow a guest user to try out the device. Since the primary user has already enrolled and the eye model used in gaze-based interactions is trained on that user's eyes, gaze-based interactions that rely on the eye model (including the estimated visual axis) would most likely not work well for the guest user. A partial or full eye enrollment may be necessary for the guest user to more easily use the gaze-based UI. However, since gaze-based interactions would initially not work well for the guest user, it would be difficult for the guest user to initiate an eye enrollment process using conventional gaze-based UI gestures.

Embodiments of methods and apparatus for gesture-based partial or full eye enrollment on a device are described that allow a guest user of a device to initiate partial or full eye enrollment even though their eye model is not known and thus conventional gaze-based interactions do not work well.

Thus, embodiments provide methods to trigger eye enrollment without requiring good gaze interaction.

In embodiments, the gaze tracking system collects gaze data in the background. At any time (or within an interval after a user puts on the device), an eye enrollment can be triggered by detecting some gaze gesture, for example rolling the eyes in a large circle, or moving the eyes randomly for a time that exceeds a threshold. Depending on the coverage of the gaze/cornea data collected in the background, a full eye enrollment or only a visual axis enrollment may be performed in response to the gesture.

Collecting the gaze data in the background may make it so that, in most cases, only visual axis enrollment needs to be performed as an additional step, as an eye model may have been generated and enrolled in the background if enough data has been collected.

While embodiments are primarily described as a way to initiate eye enrollment for a guest user, embodiments may be extended to apply to the primary user as well. For example, if the primary user senses that gaze tracking is not optimal, the primary user may initiate a new eye enrollment (either full eye enrollment or only visual axis enrollment) by making the gesture.

Any of various gestures may be used in embodiments, with a constraint that the gesture should be a movement of the eyes that would rarely or never be encountered during other normal use of the device. In other words, the gesture should be unique to the system. In addition, in some embodiments, two or more different gestures may be used; for example, a first gesture that is used by a guest user to initiate eye enrollment and a second gesture that is used by a primary user to re-enroll the visual axis.

Figure 2:
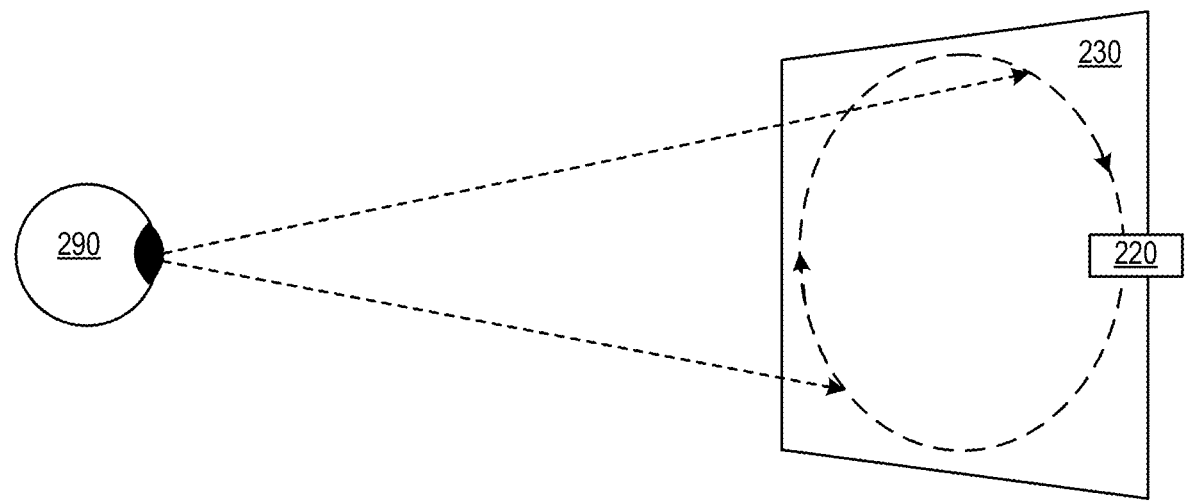
FIG. 2 graphically illustrates a method for initiating a partial or full eye enrollment using an eye gesture, according to some embodiments.
Figure 6A:
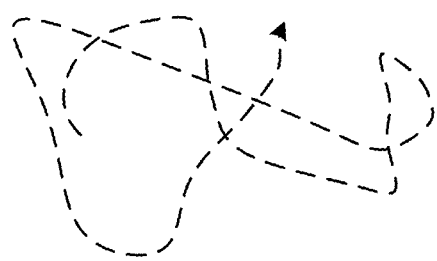
FIGS. 6A through 6C illustrate some example eye gestures that may be used in embodiments.
Figure 6B:
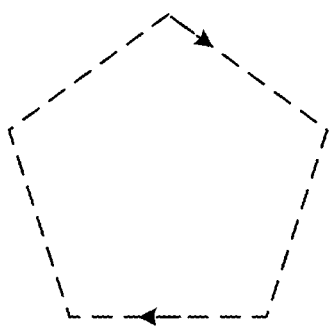
Figure 6C:
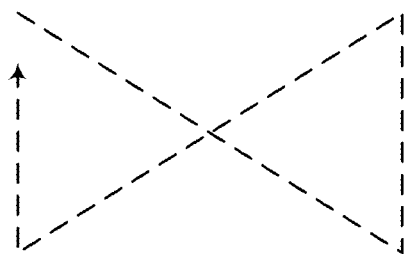

FIG. 2 graphically illustrates a method for initiating a partial or full eye enrollment using an eye gesture, according to some embodiments. A device such as an HMD may include a display 230 positioned in front of a user's eye 290 and one or more eye tracking cameras 220 positioned to have a view of the user's eye 290. At any time (or within an interval after a user puts on the device), an eye enrollment can be triggered by detecting an eye enrollment gesture, for example rolling the eyes in a large circle, or moving the eyes randomly for a time that exceeds a threshold. Eye enrollment may be initiated by a guest user of the device, or alternatively by the primary user. If an eye enrollment is desired, the user can initiate the eye enrollment by making a gesture with their eye 290. The eye tracking camera captures video of the movements of the eye 290; the captured video is processed to track the pose of the eye. The changes in the pose of the eye 290 with respect to the display 230 are analyzed/interpreted by gaze tracking algorithms to recognize various eye positions and gestures with respect to the display 230, including but not limited to the eye enrollment gesture. The eye enrollment gesture may be a specified motion that is recognized by the gaze tracking algorithms, such as making a full circle of the gaze around the display 230 as shown in this example. In some embodiments, the direction of the motion (e.g., clockwise or counterclockwise) may also be specified. In some embodiments, the gesture may include making the motion more than once, for example making two full circles, to be recognized by the gaze tracking algorithms. Alternatively, the eye enrollment gesture may be randomly moving the gaze around the display. In some embodiments, the gaze tracking algorithms may recognize this random motion as the eye enrollment gesture if the random motion continues for more than a threshold amount of time (e.g., one second). FIGS. 6A through 6C provide some example eye gestures that may be used in embodiments. Depending on the coverage of the gaze/cornea data collected in the background, a full eye enrollment or only a visual axis enrollment may be performed in response to the eye enrollment gesture.

Figure 3:
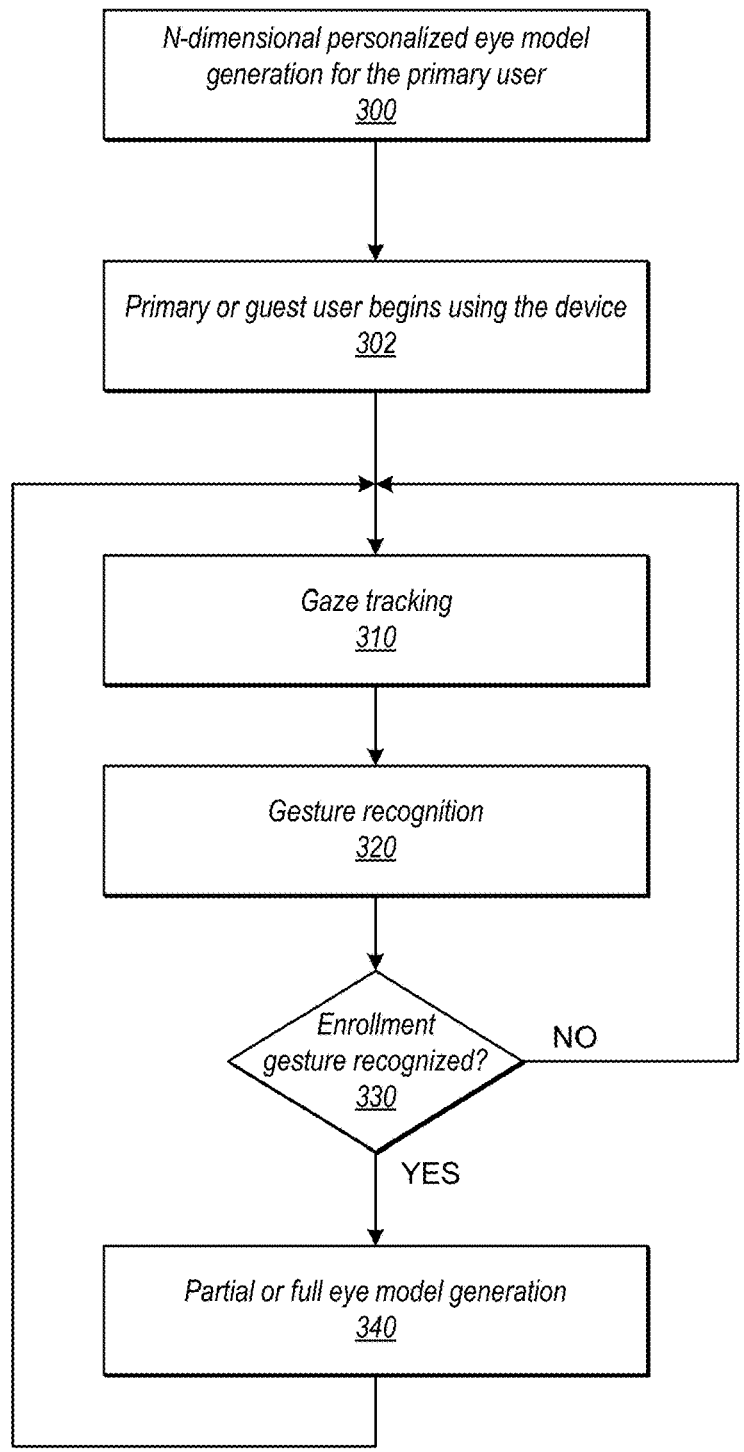
FIG. 3 is a high-level of a method for initiating a partial or full eye enrollment using an eye gesture, according to some embodiments.

FIG. 3 is a high-level flowchart of a method for initiating a partial or full eye enrollment using an eye gesture, according to some embodiments. At 300, an N-dimensional personalized eye model may be generated for a primary user of the device. This may be performed unobtrusively during an enrollment process for the device. At 302, the primary user may begin using the device. Alternatively, a guest user may be allowed to use the device. As the user uses the device, gaze tracking 310 is performed, and a gesture recognition algorithm 320 processes eye pose information with regard to the display of the device to detect eye interactions with the device interface and other eye gestures, including the eye enrollment gesture as described above with reference to FIG. 2. At any time (or within an interval after the user puts on the device), an eye enrollment can be triggered by detecting the eye enrollment gesture, for example rolling the eyes in a large circle, or moving the eyes randomly for a time that exceeds a threshold. If the eye enrollment gesture is recognized at 330, then at 340 a partial or full eye enrollment may be performed based on eye pose information captured and processed by the gaze tracking system. Depending on the coverage of the gaze/cornea data collected in the background, a full eye enrollment or only a visual axis enrollment may be performed in response to the eye enrollment gesture.

Figure 4:
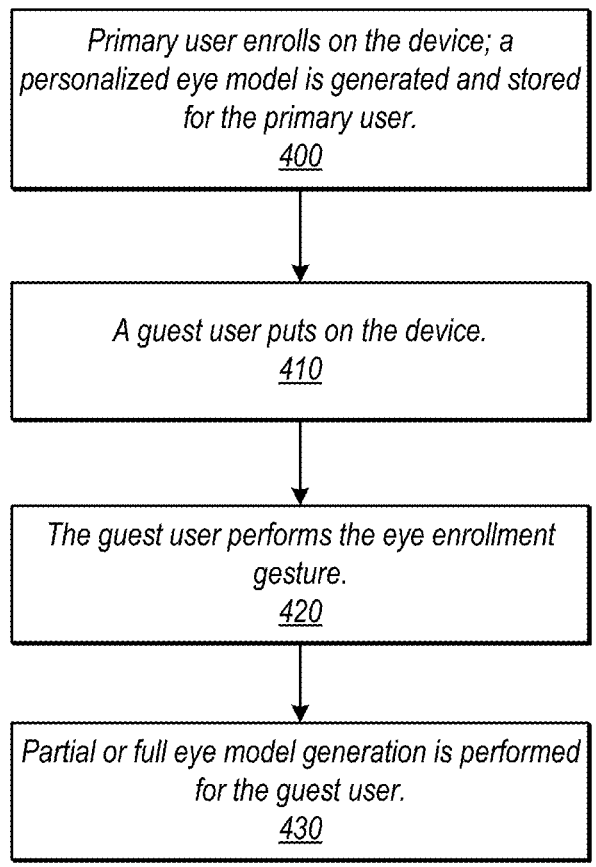
FIG. 4 is a high-level flowchart of a method for a guest user to initiate a partial or full eye enrollment using an eye gesture, according to some embodiments.

FIG. 4 is a high-level flowchart of a method for a guest user to initiate a partial or full eye enrollment using an eye gesture, according to some embodiments. As indicated at 400, the primary user enrolls on the device; during enrollment, a personalized eye model including an optical axis and visual axis may be generated and stored for the primary user. The primary user can then use the gaze-based user interface without difficulty. As indicated at 410, a guest user puts on the device. Since the guest user does not have a personalized eye model on the device, gaze-based interactions may not work well for the user. Thus, a method is provided for the user to initiate a partial or full eye enrollment even though their eye model is not known and thus gaze-based interactions do not work well. The gaze tracking system collects gaze data in the background. As indicated at 420, the guest user performs the specified eye enrollment gesture to initiate a partial or full eye enrollment, for example as described in reference to FIG. 2. At any time (or within an interval after the guest user puts on the device), an eye enrollment can be triggered by detecting an eye enrollment gesture, for example rolling the eyes in a large circle, or moving the eyes randomly for a time that exceeds a threshold. As indicated at 430, a partial or full eye enrollment is performed in response to the gesture to estimate a visual axis or to generate a full eye model including an optical axis and visual axis for the guest user. Depending on the coverage of the gaze/cornea data collected in the background, a full eye enrollment or only a visual axis enrollment may be performed for the guest user in response to the eye enrollment gesture.

Figure 5:
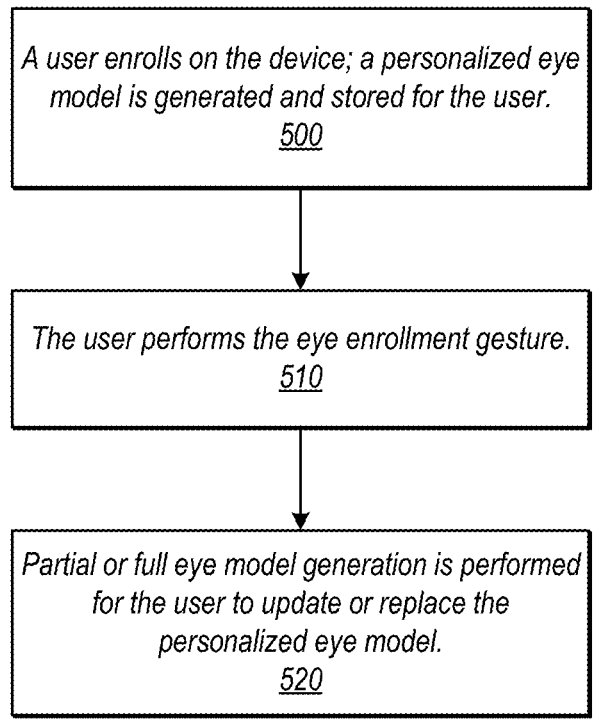
FIG. 5 is a high-level flowchart of a method for a user to initiate a partial or full eye enrollment using an eye gesture, according to some embodiments.

FIG. 5 is a high-level flowchart of a method for a user to initiate a partial or full eye enrollment using an eye gesture, according to some embodiments. While embodiments are primarily described as a way to initiate eye enrollment for a guest user, embodiments may be extended to apply to the primary user as well. For example, if the primary user senses that gaze tracking is not optimal, the primary user may initiate a new eye enrollment (either full eye enrollment or only visual axis enrollment) by making the gesture. As indicated at 500, a user enrolls on the device; during enrollment, a personalized eye model including an optical axis and visual axis is generated and stored for the user. The user may then be able use the gaze-based user interface without difficulty. However, if the user senses that gaze tracking is not optimal, the user may initiate a new eye enrollment (either full eye enrollment or only visual axis enrollment) by making the eye enrollment gesture. As indicated at 510, the user performs the eye enrollment gesture, for example as illustrated in FIG. 2. As indicated at 520, an eye enrollment process is initiated in which partial (visual axis only) or full eye model generation is performed for the user to update or replace the personalized eye model.

Note that the "user" in elements 500 through 520 of FIG. 5 may be the primary user. However, a guest user, after an initial enrollment as illustrated in FIG. 4, may re-initiate eye enrollment using this method as well to update or replace their eye model.

FIGS. 6A through 6C illustrate some example eye gestures that may be used in embodiments. FIG. 2 provided an example eye enrollment gesture that consisted of a full circular motion made one or more times with respect to the display. FIG. 6A illustrates an example eye enrollment gesture that involves moving the eyes randomly with respect to the display for a time that exceeds a threshold. FIG. 6B illustrates an example eye enrollment gesture that involved moving the eyes in some other geometric pattern, such as a pentagram or star. FIG. 6C illustrates moving the eyes in a crisscross pattern as an eye enrollment gesture.

Note that these example eye enrollment gestures are not intended to be limiting; any of various patterns may be used, with a constraint that the gesture should be a movement of the eyes that would rarely or never be encountered during other normal use of the device. In other words, the gesture should be unique to the system. In addition, in some embodiments, two or more different gestures may be used; for example, a first gesture that is used by a guest user to initiate partial or full eye enrollment and a second gesture that is used by a primary user to re-enroll the visual axis.

While embodiments are generally described and illustrated with reference to one eye, there may be eye tracking cameras for both eyes, and gaze tracking may be performed for both eyes, and thus the technology described herein may be implemented for both the left and right eyes in an HMD.

Figure 7A:
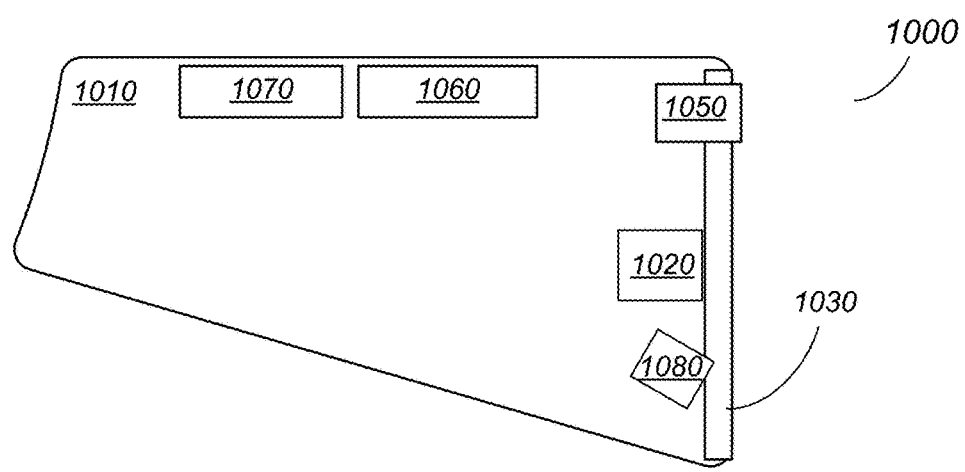
FIGS. 7A through 7C illustrate example devices in which the methods of FIGS. 1 through 6C may be implemented, according to some embodiments.
Figure 7B:
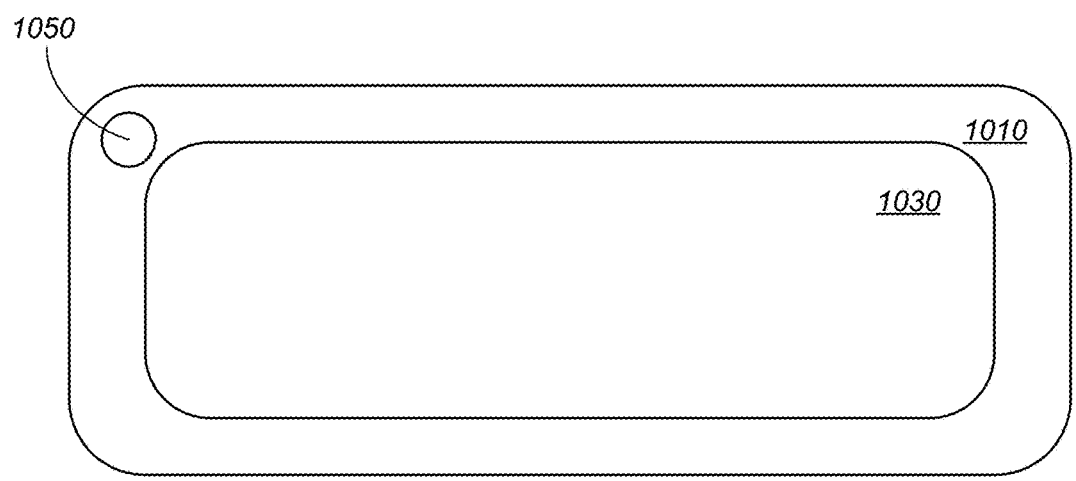
Figure 7C:
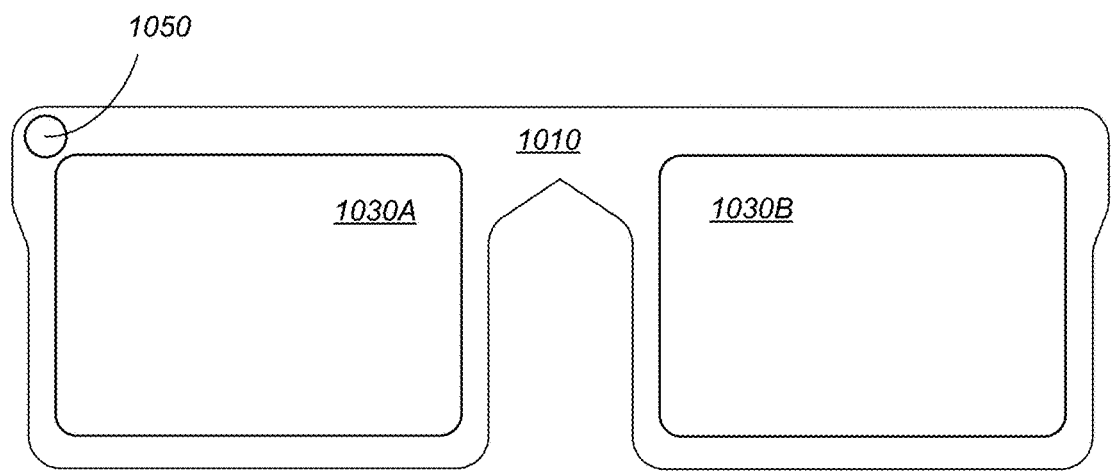

FIGS. 7A through 7C illustrate example devices in which the methods of FIGS. 1 through 6C may be implemented, according to some embodiments. Note that the HMDs 1000 as illustrated in FIGS. 7A through 7C are given by way of example, and are not intended to be limiting. In various embodiments, the shape, size, and other features of an HMD 1000 may differ, and the locations, numbers, types, and other features of the components of an HMD 1000 and of the eye imaging system. FIG. 7A shows a side view of an example HMD 1000, and FIGS. 7B and 7C show alternative front views of example HMDs 1000, with FIG. 7A showing device that has one lens 1030 that covers both eyes and FIG. 7B showing a device that has right 1030A and left 1030B lenses.

HMD 1000 may include lens(es) 1030, mounted in a wearable housing or frame 1010. HMD 1000 may be worn on a user's head (the "wearer") so that the lens(es) is disposed in front of the wearer's eyes. In some embodiments, an HMD 1000 may implement any of various types of display technologies or display systems. For example, HMD 1000 may include a display system that directs light that forms images (virtual content) through one or more layers of waveguides in the lens(es) 1030; output couplers of the waveguides (e.g., relief gratings or volume holography) may output the light towards the wearer to form images at or near the wearer's eyes. As another example, HMD 1000 may include a direct retinal projector system that directs light towards reflective components of the lens(es); the reflective lens(es) is configured to redirect the light to form images at the wearer's eyes.

In some embodiments, HMD 1000 may also include one or more sensors that collect information about the wearer's environment (video, depth information, lighting information, etc.) and about the wearer (e.g., eye or gaze tracking sensors). The sensors may include one or more of, but are not limited to one or more eye tracking cameras 1020 (e.g., infrared (IR) cameras) that capture views of the user's eyes, one or more world-facing or PoV cameras 1050 (e.g., RGB video cameras) that can capture images or video of the real-world environment in a field of view in front of the user, and one or more ambient light sensors that capture lighting information for the environment. Cameras 1020 and 1050 may be integrated in or attached to the frame 1010. HMD 1000 may also include one or more light sources 1080 such as LED or infrared point light sources that emit light (e.g., light in the IR portion of the spectrum) towards the user's eye or eyes.

A controller 1060 for the XR system may be implemented in the HMD 1000, or alternatively may be implemented at least in part by an external device (e.g., a computing system or handheld device) that is communicatively coupled to HMD 1000 via a wired or wireless interface. Controller 1060 may include one or more of various types of processors, image signal processors (ISPs), graphics processing units (GPUs), coder/decoders (codecs), system on a chip (SOC), CPUs, and/or other components for processing and rendering video and/or images. In some embodiments, controller 1060 may render frames (each frame including a left and right image) that include virtual content based at least in part on inputs obtained from the sensors and from an eye tracking system, and may provide the frames to the display system.

Memory 1070 for the XR system may be implemented in the HMD 1000, or alternatively may be implemented at least in part by an external device (e.g., a computing system) that is communicatively coupled to HMD 1000 via a wired or wireless interface. The memory 1070 may, for example, be used to record video or images captured by the one or more cameras 1050 integrated in or attached to frame 1010. Memory 1070 may include any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used in an HMD to store processed data, such as Flash or other "hard drive" technologies. This other storage may be separate from the externally coupled storage mentioned below.

While FIGS. 7A through 7C only show light sources 1080 and cameras 1020 and 1050 for one eye, embodiments may include light sources 1080 and cameras 1020 and 1050 for each eye, and gaze tracking may be performed for both eyes. In addition, the light sources, 1080, eye tracking camera 1020 and PoV camera 1050 may be located elsewhere than shown.

Embodiments of an HMD 1000 as illustrated in FIGS. 7A through 7C may, for example, be used in augmented or mixed (AR) applications to provide augmented or mixed reality views to the wearer. HMD 1000 may include one or more sensors, for example located on external surfaces of the HMD 1000, that collect information about the wearer's external environment (video, depth information, lighting information, etc.); the sensors may provide the collected information to controller 1060 of the XR system. The sensors may include one or more visible light cameras 1050 (e.g., RGB video cameras) that capture video of the wearer's environment that, in some embodiments, may be used to provide the wearer with a virtual view of their real environment. In some embodiments, video streams of the real environment captured by the visible light cameras 1050 may be processed by the controller 1060 of the HMD 1000 to render augmented or mixed reality frames that include virtual content overlaid on the view of the real environment, and the rendered frames may be provided to the display system. In some embodiments, input from the eye tracking camera 1020 may be used in a PCCR gaze tracking process executed by the controller 1060 to track the gaze/pose of the user's eyes for use in rendering the augmented or mixed reality content for display. In addition, one or more of the methods as illustrated in FIGS. 1 through 6C may be implemented in the HMD to provide gesture-based partial or full eye enrollment for the HMD 1000.

Figure 8:
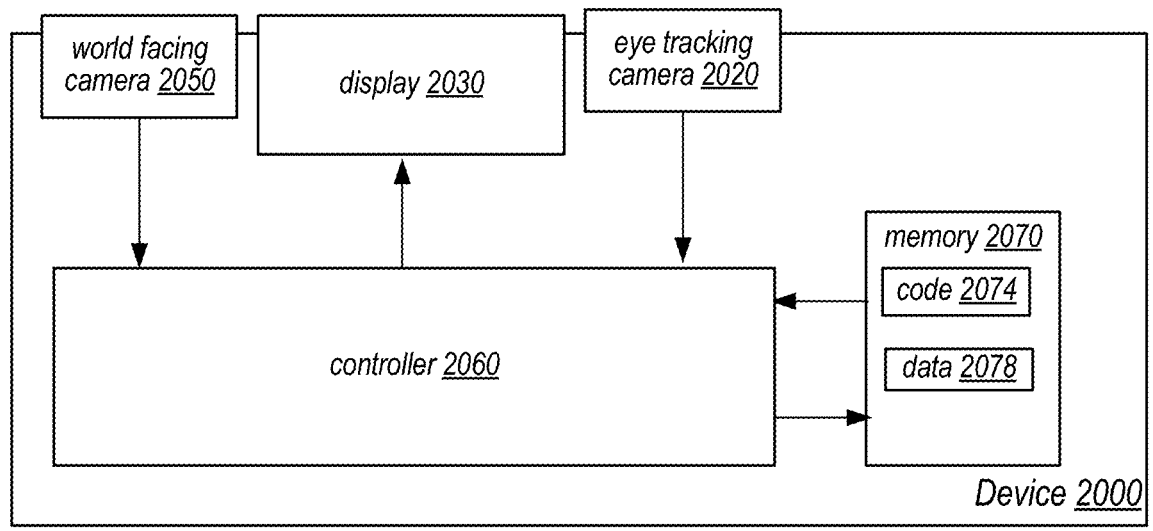
FIG. 8 is a block diagram illustrating an example device that may include components and implement methods as illustrated in FIGS. 1 through 6C, according to some embodiments.

FIG. 8 is a block diagram illustrating an example device that may include components and implement methods as illustrated in FIGS. 1 through 6C, according to some embodiments.

In some embodiments, an XR system may include a device 2000 such as a headset, helmet, goggles, or glasses. Device 2000 may implement any of various types of display technologies. For example, device 2000 may include a transparent or translucent display 2060 (e.g., eyeglass lenses) through which the user may view the real environment and a medium integrated with display 2060 through which light representative of virtual images is directed to the wearer's eyes to provide an augmented view of reality to the wearer.

In some embodiments, device 2000 may include a controller 2060 configured to implement functionality of the XR system and to generate frames (each frame including a left and right image) that are provided to display 2030. In some embodiments, device 2000 may also include memory 2070 configured to store software (code 2074) of the XR system that is executable by the controller 2060, as well as data 2078 that may be used by the XR system when executing on the controller 2060. In some embodiments, memory 2070 may also be used to store video captured by camera 2050. In some embodiments, device 2000 may also include one or more interfaces (e.g., a Bluetooth technology interface, USB interface, etc.) configured to communicate with an external device (not shown) via a wired or wireless connection. In some embodiments, at least a part of the functionality described for the controller 2060 may be implemented by the external device. The external device may be or may include any type of computing system or computing device, such as a desktop computer, notebook or laptop computer, pad or tablet device, smartphone, hand-held computing device, game controller, game system, and so on.

In various embodiments, controller 2060 may be a uniprocessor system including one processor, or a multiprocessor system including several processors (e.g., two, four, eight, or another suitable number). Controller 2060 may include central processing units (CPUs) configured to implement any suitable instruction set architecture, and may be configured to execute instructions defined in that instruction set architecture. For example, in various embodiments controller 2060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2060 may employ any microarchitecture, including scalar, superscalar, pipelined, superpipelined, out of order, in order, speculative, non-speculative, etc., or combinations thereof. Controller 2060 may include circuitry to implement microcoding techniques. Controller 2060 may include one or more processing cores each configured to execute instructions. Controller 2060 may include one or more levels of caches, which may employ any size and any configuration (set associative, direct mapped, etc.). In some embodiments, controller 2060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2060 may include one or more other components for processing and rendering video and/or images, for example image signal processors (ISPs), coder/decoders (codecs), etc.

Memory 2070 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies.

In some embodiments, device 2000 may include one or more sensors that collect information about the user's environment (video, depth information, lighting information, etc.). The sensors may provide the information to the controller 2060 of the XR system. In some embodiments, the sensors may include, but are not limited to, at least one visible light camera (e.g., an RGB video camera) 2050, ambient light sensors, and at least on eye tracking camera 2020. In some embodiments, device 2000 may also include one or more IR light sources; light from the light sources reflected off the eye may be captured by the eye tracking camera 2020. Gaze tracking algorithms implemented by controller 2060 may process images or video of the eye captured by the camera 2020 to determine eye pose and gaze direction. In addition, one or more of the methods as illustrated in FIGS. 1 through 6C may be implemented in device 2000 to provide gesture-based partial or full eye enrollment for the device 2000.

In some embodiments, device 2000 may be configured to render and display frames to provide an augmented or mixed reality (MR) view for the user based at least in part according to sensor inputs, including input from the eye tracking camera 2020. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by the XR system and composited with the displayed view of the user's real environment.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a display configured to be positioned in front of an eye;
an eye-facing camera configured to capture images of the eye; and
a controller comprising one or more processors configured to:
detect an eye enrollment gesture of a gaze-based user interface performed by the eye based on images of the eye captured by the eye-facing camera, wherein the eye enrollment gesture triggers an eye enrollment and is configured to be detected using an eye model that has not been calibrated to the eye for the gaze-based user interface; and
perform the eye enrollment for the eye in response to said detection of the eye enrollment gesture.

2. The device as recited in claim 1, wherein the eye enrollment estimates a visual axis of the eye.

3. The device as recited in claim 1, wherein the eye enrollment generates a multidimensional personalized eye model for the eye including an optical axis and a visual axis of the eye.

4. The device as recited in claim 1, wherein the eye enrollment gesture is a unique motion of the eye with respect to the display.

5. The device as recited in claim 1, wherein the eye enrollment gesture is rolling the eye in a circle with respect to the display for one or more revolutions.

6. The device as recited in claim 1, wherein the eye enrollment gesture is moving the eye randomly with respect to the display for at least a threshold amount of time.

7. The device as recited in claim 1, wherein the controller is further configured to generate a multidimensional personalized eye model including an optical axis and a visual axis for a primary user of the device prior to said detecting the eye enrollment gesture.

8. The device as recited in claim 7, wherein the eye enrollment gesture is performed by a guest user of the device.

9. The device as recited in claim 7, wherein the eye enrollment gesture is performed by the primary user of the device.

10. The device as recited in claim 1,
wherein the controller is further configured to, prior to said detecting the eye enrollment gesture, collect eye pose data based on images of the eye captured by the eye facing camera; and
wherein, to perform an eye enrollment for the eye in response to said detection of the eye enrollment gesture, the controller is configured to:
if a sufficient amount of eye pose data has been collected in a background to perform full eye enrollment, generate a multidimensional personalized eye model for the eye including an optical axis and a visual axis; and
if a sufficient amount of eye pose data has not been collected in the background to perform full eye enrollment, estimate a visual axis for the eye.

11. The device as recited in claim 1, wherein the device is a head-mounted device (HMD) of an extended reality (XR) system.

12. A method, comprising:
performing, by a controller comprising one or more processors:
detecting an eye enrollment gesture of a gaze-based user interface performed by an eye based on images of the eye captured by an eye-facing camera, wherein the eye enrollment gesture triggers an eye enrollment and is configured to be detected using an eye model that has not been calibrated to the eye for the gaze-based user interface; and
performing the eye enrollment for the eye in response to said detecting the eye enrollment gesture.

13. The method as recited in claim 12, wherein performing an eye enrollment for the eye comprises estimating a visual axis of the eye.

14. The method as recited in claim 12, wherein performing an eye enrollment for the eye comprises generating a multidimensional personalized eye model for the eye including an optical axis and a visual axis of the eye.

15. The method as recited in claim 12, wherein the eye enrollment gesture is a unique motion of the eye with respect to the display.

16. The method as recited in claim 12, wherein the eye enrollment gesture is rolling the eye in a circle with respect to the display for one or more revolutions.

17. The method as recited in claim 12, wherein the eye enrollment gesture is moving the eye randomly with respect to the display for at least a threshold amount of time.

18. The method as recited in claim 12, further comprising generating a multidimensional personalized eye model including an optical axis and a visual axis for a primary user of a device comprising the controller prior to said detecting the eye enrollment gesture.

19. The method as recited in claim 12, further comprising:
prior to said detecting the eye enrollment gesture, collecting eye pose data based on images of the eye captured by the eye facing camera; and
wherein, performing an eye enrollment for the eye in response to said detection of the eye enrollment gesture comprises:
if a sufficient amount of eye pose data has been collected in a background to perform full eye enrollment, generating a multidimensional personalized eye model for the eye including an optical axis and a visual axis; and
if a sufficient amount of eye pose data has not been collected in the background to perform full eye enrollment, estimating a visual axis for the eye.

20. A system, comprising:
a head-mounted device (HMD), comprising
a display configured to be positioned in front of an eye;
an eye-facing camera configured to capture images of the eye; and
a controller comprising one or more processors configured to:
collect eye pose data based on images of the eye captured by the eye facing camera;
detect an eye enrollment gesture of a gaze-based user interface performed by the eye based on the eye pose data, wherein the eye enrollment gesture triggers an eye enrollment and is configured to be detected using an eye model that has not been calibrated to the eye for the gaze-based user interface; and
perform the eye enrollment for the eye in response to said detection of the eye enrollment gesture.

* * * * *